United States Patent
Ohmura et al.

(10) Patent No.: US 10,704,634 B2
(45) Date of Patent: Jul. 7, 2020

(54) LOWER-SIDE SPRING-RECEIVING MEMBER

(71) Applicant: NHK SPRING CO., LTD., Kanagawa (JP)

(72) Inventors: Shuji Ohmura, Kanagawa (JP); Shohei Hosomi, Kanagawa (JP); Jun Umeno, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 15/551,500

(22) PCT Filed: Feb. 4, 2016

(86) PCT No.: PCT/JP2016/053412
§ 371 (c)(1),
(2) Date: Aug. 16, 2017

(87) PCT Pub. No.: WO2016/132926
PCT Pub. Date: Aug. 25, 2016

(65) Prior Publication Data
US 2018/0038437 A1 Feb. 8, 2018

(30) Foreign Application Priority Data

Feb. 17, 2015 (JP) ................. 2015-028305

(51) Int. Cl.
*B60G 11/16* (2006.01)
*F16F 1/12* (2006.01)
(Continued)

(52) U.S. Cl.
CPC .............. *F16F 1/122* (2013.01); *B60G 11/16* (2013.01); *B60G 15/063* (2013.01);
(Continued)

(58) Field of Classification Search
CPC ................. B60G 11/16; B60G 11/52
(Continued)

(56) References Cited

U.S. PATENT DOCUMENTS 3,263,983 A    8/1966 Bliven et al.
6,273,407 B1 * 8/2001 Germano ............. B60G 13/005
                                                                267/172
(Continued)

FOREIGN PATENT DOCUMENTS

CN    101514732 B    12/2010
JP    2003118341 A    4/2003
(Continued)

OTHER PUBLICATIONS

Extended European Search Report for Application No. EP 16752313.3, dated Oct. 8, 2018.
(Continued)

*Primary Examiner* — Christopher P Schwartz
(74) *Attorney, Agent, or Firm* — Marshall, Gerstein & Borun LLP (57) ABSTRACT

A lower-side spring receiving member is adapted to receive a compression spring provided with an effective part, end turn parts which do not elastically deform, and rising parts located between the effective part and the end turn parts, at a lower side of the compression spring. The lower-side spring receiving member is provided with a contact part which is formed to protrude outward from an end at one side in the extending direction thereof, and which is in contact with the rising part so as not to form a gap between the contact part and the rising part. The contact part is in contact with the rising part of the compression spring by an elastic force caused by elastic deformation, regardless of a load on the compression spring.

5 Claims, 7 Drawing Sheets

(51) Int. Cl.
*B60G 15/06* (2006.01)
*F16F 9/512* (2006.01)

(52) U.S. Cl.
CPC ............ *B60G 15/065* (2013.01); *F16F 1/126* (2013.01); *F16F 9/5126* (2013.01); *B60G 2202/12* (2013.01); *B60G 2202/143* (2013.01); *B60G 2202/312* (2013.01); *B60G 2204/125* (2013.01); *B60G 2204/12422* (2013.01); *B60G 2206/73* (2013.01); *F16F 2230/0023* (2013.01)

(58) Field of Classification Search
USPC ................. 267/33, 219, 220; 188/321.11
See application file for complete search history.

(56) References Cited

U.S. PATENT DOCUMENTS

| | | | | |
|---|---|---|---|---|
| 9,499,021 B2* | 11/2016 | Nakano | ................. | B60G 11/16 |
| 10,005,334 B2* | 6/2018 | Ando | ................. | B60G 15/063 |
| 2004/0094879 A1* | 5/2004 | Duval | ................. | F16F 1/024 |
| | | | | 267/33 |
| 2006/0131119 A1* | 6/2006 | Ishikawa | ............. | B60G 15/063 |
| | | | | 188/321.11 |
| 2014/0265081 A1* | 9/2014 | Nakano | ................. | B60G 11/16 |
| | | | | 267/220 |
| 2016/0031280 A1* | 2/2016 | Arano | ................. | B60G 11/16 |
| | | | | 267/219 |
| 2018/0045263 A1* | 2/2018 | Ohmura | ................. | F16F 1/121 |

FOREIGN PATENT DOCUMENTS

| | | |
|---|---|---|
| JP | 2014181776 A | 9/2014 |
| JP | 2014199134 A | 10/2014 |
| WO | WO-2014148364 A1 | 9/2014 |

OTHER PUBLICATIONS

International Search Report and Written Opinion for Application No. PCT/JP2016/053412, dated Mar. 1, 2016.

Office Action, corresponding Chinese Patent Application No. 201680010342.9 dated Jul. 27, 2018. (English Translation).

* cited by examiner

FIG. 6
*Conventional*

LOWER-SIDE SPRING-RECEIVING MEMBER

CROSS-REFERENCE TO RELATED APPLICATION

The present application is the U.S. national phase of International Application No. PCT/JP2016/053412 filed Feb. 4, 2016, which claims priority to Japanese Application No. 2015-028305 filed Feb. 17, 2015. The entirety of each of International Application No. PCT/JP2016/053412 and Japanese Application No. 2015-028305 are incorporated herein by reference.

TECHNICAL FIELD

The present invention relates to a lower-side spring receiving member that is adapted to receive a compression spring at a lower side of the compression spring.

BACKGROUND ART

In conventional art, in relation to upper/lower-side spring receiving members adapted to receive a suspension spring at upper and lower sides of the suspension spring, Patent Literature 1 discloses the following configuration.

As shown in FIG. 10 in Patent Literature 1, a spring seat rubber 20 is interposed between an upper end of a coil spring and a fitting convex part 14 of an upper body-side member 10. Moreover, a spring seat rubber 22 is interposed between a lower end of the coil spring and a fitting convex part 16 of a lower arm member 12.

CITATION LIST

Patent Literature

Patent Literature 1: Japanese Unexamined Patent Application Publication No. 2003-118341 (Paragraph 0003, FIG. 10).

SUMMARY OF THE INVENTION

Technical Problem

Incidentally, in conventional art including Patent Literature 1, the lower-side spring seat rubber mount 22 (lower-side spring receiving member) may pose a problem that, when a wheel moves up and down, the lower-side spring seat rubber mount 22 (lower-side spring receiving member) does not follow deformation of the coil spring, allowing a gap to be formed between the lower-side spring seat rubber mount 22 and the coil spring.

Figure 6:
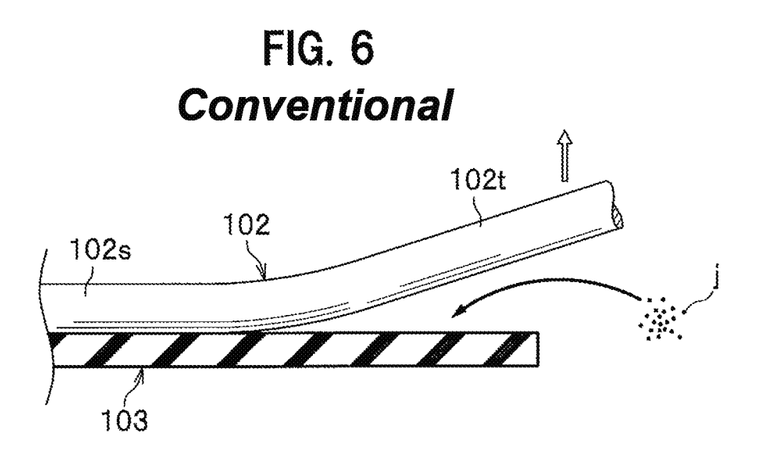
FIG. 6 is a sectional view showing a contact part of a conventional suspension spring and a lower rubber pad.

FIG. 6 is a sectional view showing a contact part of a conventional suspension spring and a lower rubber pad.

A conventional lower rubber pad 103 has no slope along a lower rising part 102t of a suspension spring 102, has a flat shape so as to receive a lower end turn part 102s of the suspension spring 102, and has no lip part either.

Consequently, the amount of deformation of the lower rising part 102t of the suspension spring 102 becomes larger as the lower rising part 102t comes near an effective part in the center of the suspension spring 102, and the amount of deformation of the lower rubber pad 103 is also gradually increased. This forms a part of the lower rubber pad 103 at which the amount of deformation is large and thus a large stress is generated, and a part of the lower rubber pad 103 at which the amount of deformation is small and thus a small stress is generated.

Accordingly, there is a risk that the stress generated in the lower rubber pad 103 becomes unequal and thus time degradation of the lower rubber pad 103 advances to shorten life of the lower rubber pad 103.

In addition, foreign substances j such as grit and gravel enter a gap between the lower rubber pad 103 and the lower rising part 102t of the suspension spring 102.

Therefore, friction of the lower rubber pad 103 with the lower end turn part 102s of the suspension spring 102 causes a coating on the suspension spring 102 to be worn away or peeled off by the foreign substances j, and causes fracture, damage or destruction of the suspension spring 102.

More specifically, the foreign substances j such as grit and gravel enter the gap to allow a surface-coated film of the suspension spring 102 to be worn away to expose the base of the suspension spring 102. This causes a problem that the suspension spring 102 is rusted, corroded, damaged or fractured. This phenomenon is notably seen particularly at a part of the suspension spring 102, which is near the lower rubber pad 103 (lower-side spring receiving member) rather than the upper side, and which allows foreign substances such as grit and gravel to easily enter.

In summary, the conventional lower rubber pad 103 has posed problems that the lower rubber pad 103 does not follow the suspension spring 102 during vibration of the suspension spring 102, allowing the gap to be formed between the lower rubber pad 103 and the suspension spring 102, and the foreign substances j such as grit and gravel having entered the gap allow the surface-coated film of the suspension spring 102 to be worn away, thereby exposing the base of the suspension spring 102 and causing corrosion of the suspension spring 102.

The present invention is made in view of the above actual situation and an object of the invention is to provide a lower-side spring receiving member having high reliability and capable of preventing damage or fracture of a compression spring and achieving life prolongation of the compression spring.

Solution to Problem

In order to solve the problems described above, the present invention provides, as a first aspect thereof, a lower-side spring receiving member adapted to receive a compression spring at a lower side of the compression spring, the compression spring having an effective part, end turn parts which do not elastically deform, and rising parts located between the effective part and the end turn parts, the lower-side spring receiving member including: a contact part that is formed to protrude outward from an end at one side in an extending direction of the lower-side spring receiving member, and adapted to be in contact with the rising part so as not to form a gap between the contact part and the rising part, wherein the contact part is in contact with the rising part by elastic force caused by elastic deformation of the compression spring, regardless of a load on the compression spring.

The lower-side spring receiving member according to the first aspect of the present invention includes the contact part that is in contact with or abuts on the rising part so as not to form a gap between the contact part and the rising part, thus allowing foreign substances such as grit and gravel to be inhibited or prevented from entering between the compression spring and the lower-side spring receiving member.

Consequently, a coated film on the compression spring is avoided from being worn away and/or peeled off by the foreign substances, and thus the compression spring is avoided from being fractured, damaged or destroyed. Therefore, life prolongation of the compression spring can be achieved.

The present invention provides, as a second aspect thereof, the lower-side spring receiving member according to the first aspect of the present invention, further including a load receiving part that is formed into a shape protruding outward on an opposite side of the contact part at the end of one side in the extending direction of the lower-side spring receiving member, and adapted to receive a spring load on the compression spring.

The lower-side spring receiving member according to the second aspect of the present invention includes the load receiving part that is formed into a shape protruding outward on the opposite side of the contact part at the end of one side in the extending direction of the lower-side spring receiving member, and adapted to receive the load (spring load) on the compression spring, thus making it possible to allow the lower-side spring receiving member to normally receive the load (spring load) on the compression spring, and to inhibit or prevent excessive internal stress from being generated. Consequently, time degradation of the lower-side spring receiving member can be suppressed and thus life prolongation of the lower-side spring receiving member can be achieved.

The present invention provides, as a third aspect thereof, the lower-side spring receiving member according to the first or second aspect of the present invention, further including an expansible deformation part that is provided between the contact part at the end of one side and a load receiving part, and adapted to elastically deform depending on a load on the compression spring, wherein the expansible deformation part has a thinner shape than the load receiving part.

The lower-side spring receiving member according to the third aspect of the present invention includes the expansible deformation part that elastically deforms depending on the load on the compression spring, thus making it possible to allow the contact part to be reliably in contact with or abut on the rising part of the compression spring regardless of the load on the compression spring.

The present invention provides, as a fourth aspect thereof, the lower-side spring receiving member according to the second aspect of the present invention, wherein the load receiving part is formed into a shape swelling outward with a convex curvature.

The lower-side spring receiving member according to the fourth aspect of the present invention allows the load receiving part to be formed into a shape swelling outward with a convex curvature, thus making it possible, when a load (spring load) on the compression spring is applied to the lower-side spring receiving member, to allow the load receiving part to normally receive the load (spring load) on the compression spring without being crushed.

The present invention provides, as a fifth aspect thereof, the lower-side spring receiving member according to the second or fourth aspect of the present invention, wherein the load receiving part is formed to protrude outward more than the contact part in a winding direction of the compression spring when viewed in an axial direction of the compression spring.

The lower-side spring receiving member according to the fifth aspect of the present invention allows the load receiving part to be formed to protrude outward more than the contact part in the winding direction of the compression spring when viewed in the axial direction of the compression spring, thus making it possible to more reliably prevent the end of the lower-side spring receiving member from being crushed outward in the winding direction of the compression spring. Also, even when the load on the compression spring is large, the contact part can be prevented from being damaged because the contact part abuts on the load receiving part.

The present invention provides, as a sixth aspect thereof, the lower-side spring receiving member according to the first aspect of the present invention, further including a sloping part that is formed to extend from a flat part, has a thickness gradually increasing along the rising part, and is adapted to receive the rising part.

The lower-side spring receiving member according to the sixth aspect of the present invention includes the sloping part having the thickness gradually increasing along the rising part of the compression spring and adapted to receive the rising part, thus allowing a part of the compression spring at which the amount of deformation is large, to be received at a part of the sloping part at which the thickness is increased. Consequently, the compression spring can be flexibly received by the lower-side spring receiving member even when the amount of deformation thereof is large, thus inhibiting or preventing excessive stress from being generated in the compression spring. Also, the sloping part of the lower-side spring receiving member can normally deform depending on the amount of deformation of the compression spring because it has the thickness depending on the amount of deformation of the compression spring. As a result, stress generated in the lower-side spring receiving member can be equalized.

The present invention provides, as a seventh aspect thereof, the lower-side spring receiving member according to the sixth aspect of the present invention, wherein a width of the sloping part viewed in an extending direction of the compression spring becomes greater as the sloping part becomes distant from the end turn part.

The lower-side spring receiving member according to the seventh aspect of the present invention allows the width of the sloping part viewed in the extending direction of the compression spring to become greater as the sloping part becomes distant from the end turn part, thus allowing the volume of the lower-side spring receiving member to become larger as deformation of the compression spring becomes large. Consequently, the amount of deformation per unit volume of the lower-side spring receiving member can be equalized to generate a nearly equalized stress, and thus the generated stress can be distributed on the lower-side spring receiving member. As a result, durability of the lower-side spring receiving member can be improved and thus life prolongation can be achieved.

The present invention provides, as an eighth aspect thereof, the lower-side spring receiving member according to the first, second, fourth, sixth or seventh aspect of the present invention, wherein the contact part is adapted to be in contact with or abut on nearly the same location on the rising part in deformation of the rising part.

The lower-side spring receiving member according to the eighth aspect of the present invention allows the contact part to be in contact with or abut on nearly the same location on the rising part in deformation of the rising part, thus allowing damage or wear of the contact part to be decreased. Consequently, life prolongation of the lower-side spring receiving member can be achieved.

The present invention provides, as a ninth aspect thereof, the lower-side spring receiving member according to the first, second, fourth, sixth, seventh or eighth aspect of the present invention, wherein an upper-side spring receiving member located on the other side of the compression spring, which is adapted to receive the compression spring together with the lower-side spring receiving member located on one side of the compression spring, and the lower-side spring receiving member are configured similarly and symmetrically.

The lower-side spring receiving member according to the ninth aspect of the present invention allows the upper-side spring receiving member adapted to receive the compression spring at the upper side of the compression spring, and the lower-side spring receiving member to be configured similarly and symmetrically, thus allowing the upper-side spring receiving member to produce the same operation and effects as in the lower-side spring receiving member according to the first to eighth aspects of the present invention.

Advantageous Effects of the Invention

The present invention allows a lower-side spring receiving member to be provided, having high reliability and capable of preventing damage or fracture of a compression spring and achieving life prolongation of the compression spring.

DESCRIPTION OF EMBODIMENTS

Embodiments of the present invention will be hereinafter described in detail with reference to the drawings as appropriate. Note that the same component is shown with the same reference sign and thus redundant description is omitted.

First Embodiment

Figure 1:
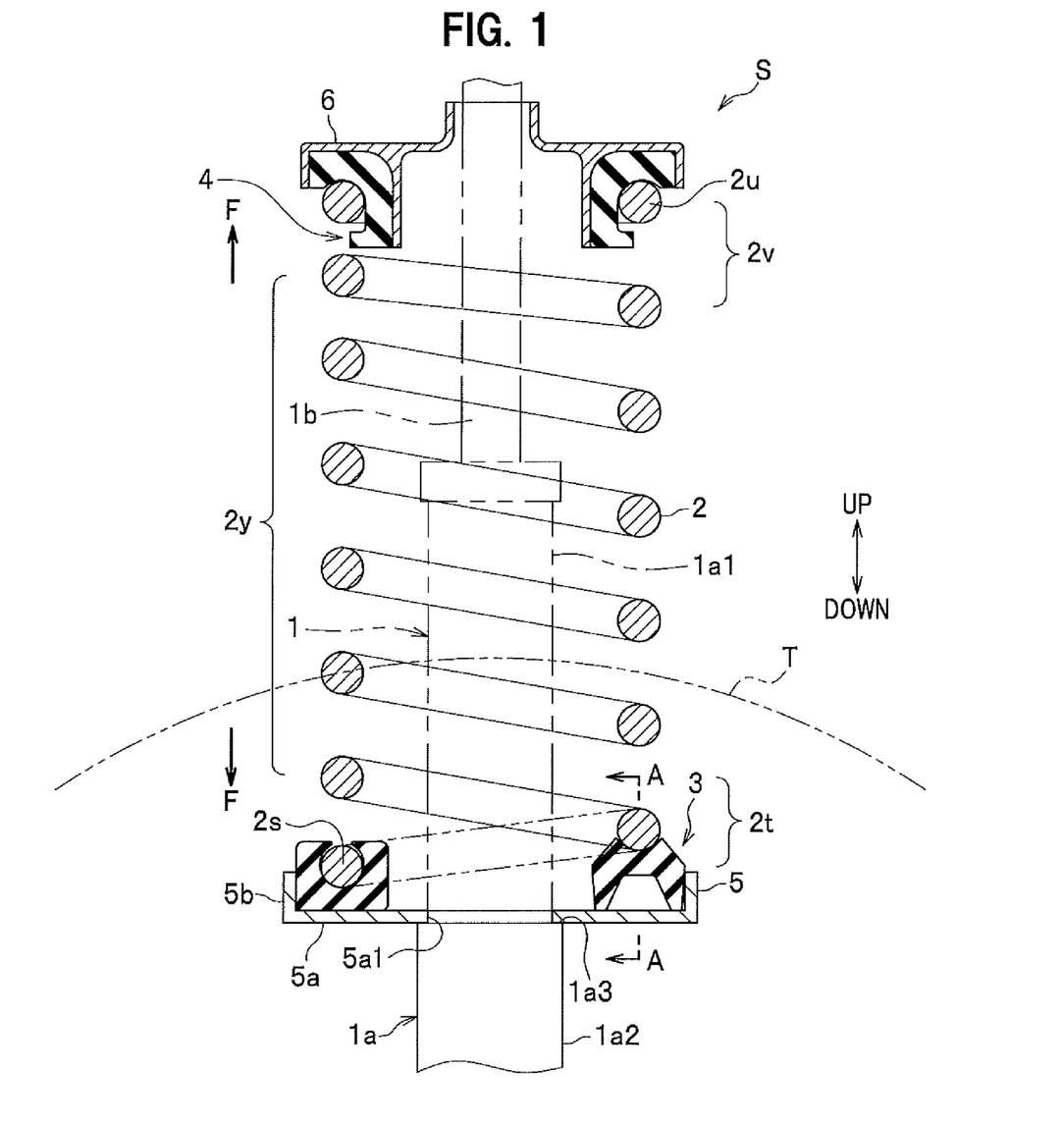
FIG. 1 is a longitudinal sectional view of a suspension device mounting thereon a lower rubber pad according to a first embodiment of the present invention.

FIG. 1 is a longitudinal sectional view of a suspension device mounting thereon a lower rubber pad according to a first embodiment of the present invention.

A suspension device S mounting thereon a lower rubber pad 3 according to the first embodiment lies between a vehicle body (not shown) and a wheel T, and is a device for damping and absorbing vibration of the wheel T, impact or the like exerted on the wheel T.

The suspension device S is provided with a shock absorber 1 and a suspension spring 2 that allows the shock absorber 1 to be inserted through the center thereof.

The suspension device S is provided with an upper rubber pad 4 and the lower rubber pad 3 on an end turn part $2u$ at an upper end of the suspension spring 2 and an end turn part $2s$ at a lower end of the suspension spring 2, respectively.

The lower rubber pad 3 and the upper rubber pad 4 are each adapted to receive elastic force F caused by compressive deformation of the suspension spring 2, with a flexible structure having elastic properties (details will be described later).

<Shock Absorber 1>

When the wheel T receives impact force or impact energy from a road surface, the shock absorber 1 is adapted to perform a telescopic operation with the load on the wheel T. At this time, the shock absorber 1 is adapted to damp the impact force or impact energy by viscous damping force of fluid sealed therein. At the same time, the suspension spring 2 is adapted to absorb the impact force by the elastic force or elastic energy caused by compressive deformation thereof, or by internal friction thereof.

The shock absorber 1 contains, for example, oil sealed therein, and allows viscous damping force to be generated by the flow of oil caused by movement of the piston. This allows the viscous damping force to be given to the telescopic operation of the shock absorber 1, thereby damping a relative motion of the wheel T relative to the vehicle body.

The shock absorber 1 is provided with an outer tube $1a$ which contains oil sealed therein, and a piston rod $1b$ to which the piston (not shown) that slides within the outer tube $1a$ is fixed. The outer tube $1a$ has a cylindrical sealing structure and contains oil sealed therein. The piston rod $1b$ has one end side to which the piston is fixed, and which is housed inside the outer tube $1a$. Moreover, the piston rod $1b$ has the other end side at which a load is received, and which extends to the outside of the outer tube $1a$ (upward in FIG. 1).

An outer peripheral surface of the outer tube $1a$ of the shock absorber 1 is formed with an annular stepped part $1a3$ which connects a small diameter part $1a1$ on the upper side with a large diameter part $1a2$ on the lower side.

The large diameter part 1a2 on the lower side has a larger diameter than the small diameter part 1a1 on the upper side.

A disc-shaped lower spring sheet 5 made of steel is locked to be fixed to the annular stepped part 1a3. The lower spring sheet 5 has an annular supporting plate part 5a having a center hole 5a1, and a side wall part 5b formed on the circumference of the plate part 5a and having a relatively low height. Here is illustrated the case where the lower spring sheet 5 has a bottomed cylindrical shape, but the lower spring sheet 5 may have the form of a dish or a mortar.

The small diameter part 1a1 of the outer tube 1a is inserted through the center hole 5a1 of the plate part 5a.

On the other hand, an upper spring sheet 6 having a nearly annular shape is provided which allows the piston rod 1b to be inserted therethrough. The upper spring sheet 6 is fixed to the vehicle body (not shown). The lower spring sheet 5 and the upper spring sheet 6 are each a press-formed article.

<Suspension Spring 2>

The suspension spring 2 is suspended between the lower spring sheet 5 and the upper spring sheet 6. The suspension spring 2 is a compression coil spring that compressively deforms to generate elastic force in the direction of extension.

The lower end part of the suspension spring 2 is formed with the lower end turn part 2s that does not function (elastically deform) as a spring. Similarly, the upper end part of the suspension spring 2 is formed with the upper end turn part 2u that does not function (elastically deform) as a spring.

The central part of the suspension spring 2 is formed with an effective part 2y that is a part adapted to function as a spring. The effective part 2y is a part that exerts a spring function which shows a spring constant k of F=kx when a load F is applied to the suspension spring 2. Herein, x denotes the amount of displacement of the suspension spring 2.

A lower rising part 2t is formed between the lower end turn part 2s of the suspension spring 2 and the effective part 2y in the central part. The lower rising part 2t is formed to spirally rise at a predetermined slant from the lower end turn part 2s. The lower rising part 2t elastically deforms by a compressive load applied thereon by the suspension spring 2.

An upper rising part 2v is formed between the upper end turn part 2u of the suspension spring 2 and the effective part 2y in the central part. As with the lower rising part 2t, the upper rising part 2v is formed to spirally rise at a predetermined slant from the upper end turn part 2u, and elastically deforms by a compressive load applied thereon.

The lower end turn part 2s and the upper end turn part 2u are each formed with the number of windings of approximately 0.5 relative to one winding of the effective part 2y, but the number of turns is not particularly limited to this example. The lower end turn part 2s and the upper end turn part 2u are formed with a relatively small number of windings of approximately 0.5, thereby making it possible to reduce the total number of windings of the suspension spring 2. In addition, the material for the suspension spring 2 can be decreased to reduce manufacturing cost of the suspension spring 2.

<Lower Rubber Pad 3>

As shown in FIG. 1, the lower rubber pad 3 is interposed between the lower spring sheet 5 and the lower end part of the suspension spring 2. Similarly, the upper rubber pad 4 is interposed between the upper spring sheet 6 and the upper end part of the suspension spring 2.

The lower end turn part 2s at the lower end of the suspension spring 2 and the lower rising part 2t are supported via the lower rubber pad 3 on the supporting plate part 5a of the lower spring sheet 5.

On the other hand, the upper end turn part 2u at the upper end of the suspension spring 2 and the upper rising part 2v are supported via the upper rubber pad 4 on the upper spring sheet 6. The lower rubber pad 3 and the upper rubber pad 4 are each a member that has functions of receiving the spring load F from the suspension spring 2 and receiving the suspension spring 2 with its flexible structure to inhibit the suspension spring 2 from being damaged.

The lower rubber pad 3 and the upper rubber pad 4 are each formed using hard rubber, for example, natural rubber (NR), but as long as they have specified properties such as flexibility and elasticity, materials are not particularly limited to this example.

The lower rubber pad 3 is brought into a compressed state in response to elastic force that resists compressive deformation of the suspension spring 2 under the condition where the suspension spring 2 is compressed by the vehicle weight or the like. The lower rubber pad 3 is supported in this state between the supporting plate part 5a of the lower spring sheet 5 and the suspension spring 2. That is, the lower rubber pad 3 is adapted to receive the lower end turn part 2s and the lower rising part 2t of the suspension spring 2, thereby allowing the elastic force by compressive deformation of the suspension spring 2 to be applied thereon.

Figure 2A:
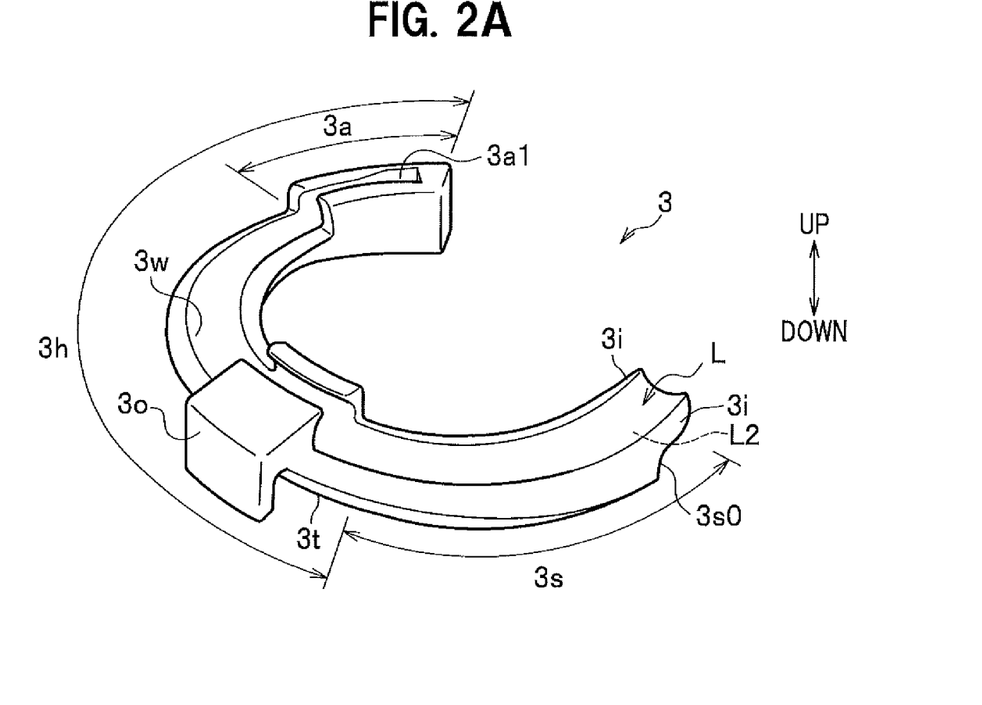
FIG. 2A is a perspective view showing the lower rubber pad which is viewed obliquely from above.
Figure 2B:
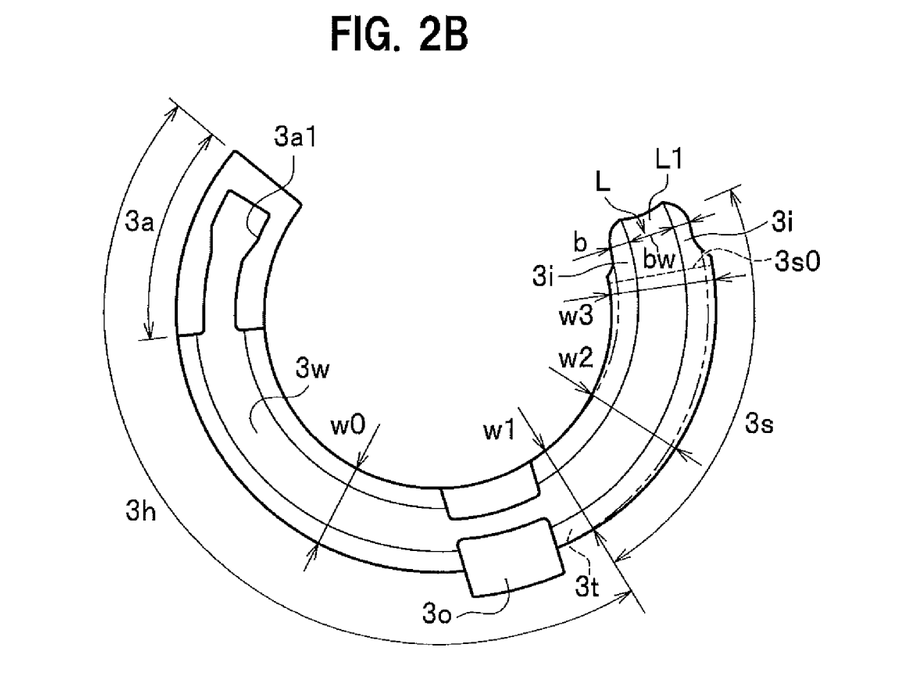
FIG. 2B is a top view showing the lower rubber pad which is viewed from above.
Figure 2C:
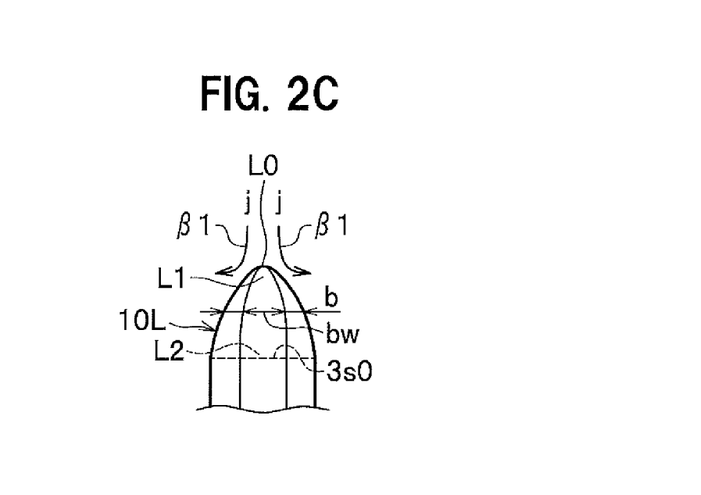
FIG. 2C is a top view showing the vicinity of a lip part of another lower rubber pad which is viewed from above.
Figure 2D:
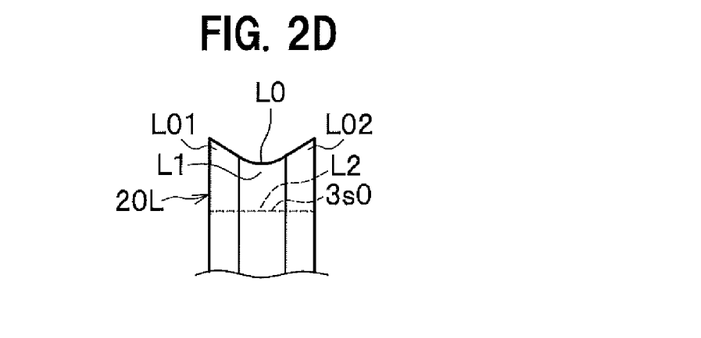
FIG. 2D is a top view showing the vicinity of a lip part of still another lower rubber pad which is viewed from above.

FIG. 2A is a perspective view showing the lower rubber pad which is viewed obliquely from above, and FIG. 2B is a top view showing the lower rubber pad which is viewed from above. FIG. 2C is a top view showing the vicinity of a lip part of another lower rubber pad which is viewed from above, and FIG. 2D is a top view showing the vicinity of a lip part of still another lower rubber pad which is viewed from above.

The lower rubber pad 3 is formed of rubber such as natural rubber (NR).

As shown in FIG. 2A, the lower rubber pad 3 has a shape which constitutes part of an annular shape that follows the shape viewed in an axial direction of the suspension spring 2, and has a shape which rises so as to eliminate (fill up) a gap between the lower rubber pad 3 and the lower end turn part 2s (see FIG. 1) and the lower rising part 2t of the suspension spring 2.

That is, the lower rubber pad 3 has a curved surface 3w which is a guide surface that abuts on the lower end turn part 2s and the lower rising part 2t of the suspension spring 2. The curved surface 3w is formed into an annular shape having nearly the same diameter as the diameter of the suspension spring 2 when viewed from the top, and is formed with being depressed below with a size nearly the same as, or a little smaller than the wire diameter of the suspension spring 2.

More specifically, the lower rubber pad 3 is formed with a base end part 3a at one end side thereof, and with a flat part 3h in flat shape including the base end part 3a. The lower rubber pad 3 is formed with a sloping part 3s having a slope at the other end side thereof. The sloping part 3s is formed into a shape having a gradually increasing thickness so as to allow the slope to be in contact with and along the lower rising part 2t at the lower end part of the suspension spring 2.

Moreover, a spring holding part 3o that holds the suspension spring 2 is provided between the base end part 3a and the sloping part 3s. The base end part 3a is adapted to allow a terminal part of the suspension spring 2 to be inserted thereinto for mounting.

Herein, the base end part 3a of the lower rubber pad 3 is formed in the shape of a wall having an upper cut-out opening 3a1 formed by cutting out an upper portion of the base end part 3a, and is formed to hold the terminal part of the suspension spring 2 with both side walls thereof. Moreover, the upper cut-out opening 3a1 of the base end part 3a is formed into a shape such that an end part thereof extends toward an edge thereof and toward both sides thereof. This allows the terminal part of the suspension spring 2 to be easily inserted into the base end part 3a through the upper cut-out opening 3a1 from above the lower rubber pad 3. Moreover, the suspension spring 2 is allowed to be easily mounted on the curved surface 3w which is a nearly annularly curved guide surface, along the extending direction of the lower rubber pad 3 from the place on which the terminal part of the suspension spring 2 abuts.

In addition, since the upper cut-out opening 3a1 is formed into a shape such that it gradually becomes narrower as it goes away from the edge side thereof, the lower rubber pad 3 after mounting the suspension spring 2 thereon has a high holding performance when holding the suspension spring 2.

Moreover, the lower rubber pad 3 is formed to allow a length from one end side to the other end side thereof to be set to, although not particularly limited to, for example, a length corresponding to the number of windings of approximately 0.6 to 0.9 of the suspension spring 2.

<Sloping Part 3s of the Lower Rubber Pad 3>

As shown in FIG. 1, the suspension spring 2 has the lower rising part 2t that spirally rises at a predetermined slant. The lower rubber pad 3 allows the length thereof to be the length corresponding to the number of windings of approximately 0.6 to 0.9 of the suspension spring 2, on which the lower end turn part 2s and part of the lower rising part 2t are held, thus making it possible to reduce manufacturing cost such as materials cost of the lower rubber pad 3. Note that the length of the lower rubber pad 3 may be set to a length on which the lower end turn part 2s and part or the entirety of the lower rising part 2t are held.

Moreover, the lower rubber pad 3 is interposed between the supporting plate part 5a (see FIG. 1) of the lower spring sheet 5 and the lower end turn part 2s and the lower rising part 2t of the suspension spring 2.

Consequently, as shown in FIG. 2A, the lower rubber pad 3 has a shape such that it receives part of the lower rising part 2t (see FIG. 1) from the lower end turn part 2s of the suspension spring 2.

Figure 3A:
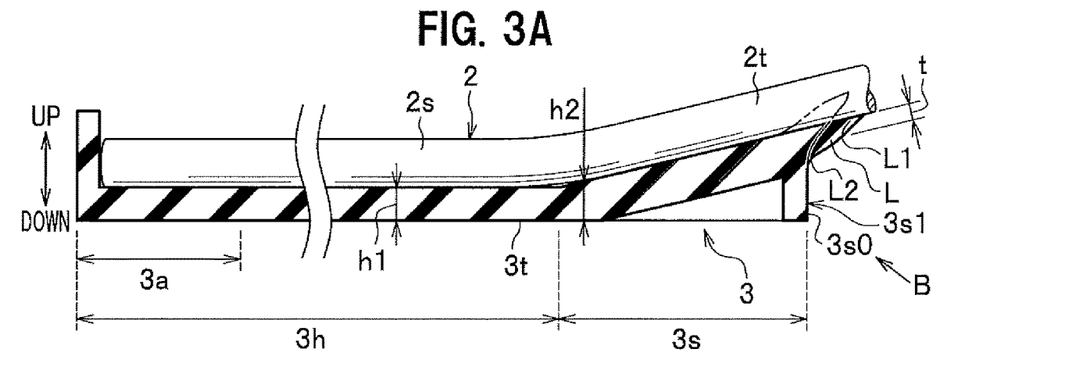
FIG. 3A is a sectional view taken along the line A-A in FIG. 1.
Figure 3B:
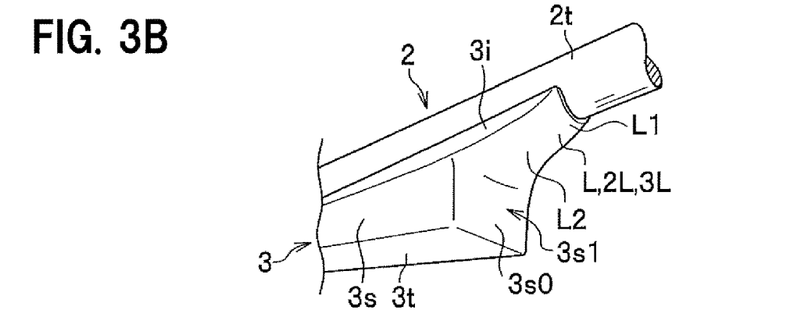
FIG. 3B is a perspective view taken in the direction of arrow B in FIG. 3A, showing a contact state of a lower rising part of a suspension spring and the lip part of the lower rubber pad.
Figure 3C:
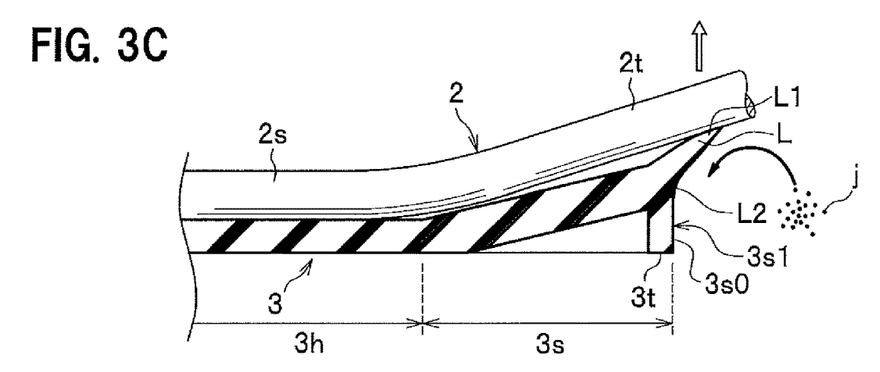
FIG. 3C is a sectional view taken along the line A-A in FIG. 1, showing a case where a load on the suspension spring becomes smallest.
Figure 3D:
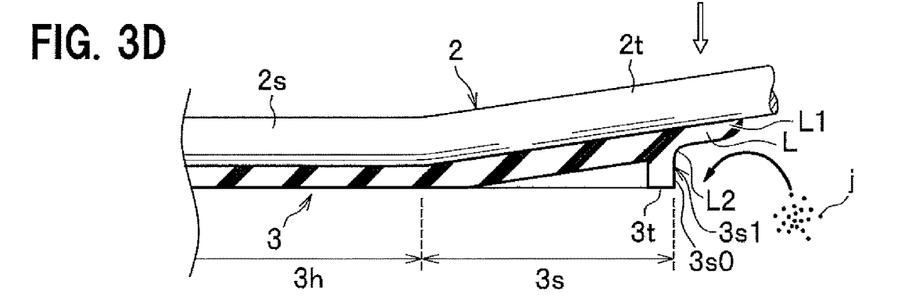
FIG. 3D is a sectional view taken along the line A-A in FIG. 1, showing a case where the load on the suspension spring becomes largest.

FIG. 3A is a sectional view taken along the line A-A in FIG. 1; FIG. 3B is a perspective view taken in the direction of arrow B in FIG. 3A, showing a contact state of the lower rising part of the suspension spring and the lip part of the lower rubber pad; FIG. 3C is a sectional view taken along the line A-A in FIG. 1, showing a case where a load on the suspension spring becomes smallest; and FIG. 3D is a sectional view taken along the line A-A in FIG. 1, showing a case where the load on the suspension spring becomes largest.

Herein, the section taken along the line A-A in FIG. 1 means a section taken along the winding direction of the suspension spring 2 when the suspension spring 2 is mounted on the lower rubber pad 3.

FIG. 3A shows a state of the suspension spring 2 and the lower rubber pad 3, which is observed when the suspension spring 2 reaches full-rebound, i.e., when only a load of the vehicle body is applied to the suspension spring 2.

FIG. 3C shows a state of the suspension spring 2 and the lower rubber pad 3, which is observed when the load on the suspension spring 2 suddenly becomes smallest.

FIG. 3D shows a state of the suspension spring 2 and the lower rubber pad 3, which is observed when the load on the suspension spring 2 becomes largest.

In the lower rubber pad 3 as shown in FIG. 3A, the flat part 3h including the base end part 3a, which is a part that receives the lower end turn part 2s of the suspension spring 2, is formed to change a thickness thereof depending on the shape of the lower end turn part 2s of the suspension spring 2. That is, the flat part 3h allows the thickness thereof to be changed so as to abut on or be in contact with the lower end turn part 2s of the suspension spring 2.

Moreover, the sloping part 3s which is a part that receives part of the lower rising part 2t of the suspension spring 2 has a thickness gradually increasing from a thickness dimension h1 to a thickness dimension h2 greater than h1 (i.e., h1<h2). In other words, the sloping part 3s is formed in a spirally rising shape (see FIG. 2A) such that it spirally slopes so as to go away from a bottom face 3t of the lower rubber pad 3 as it becomes distant from the flat part 3h.

Thus, the lower rubber pad 3 has the flat part 3h and the sloping part 3s, and the sloping part 3s allows the thickness thereof in the extending direction of the suspension spring 2 to become thick along the shape of the lower rising part 2t of the suspension spring 2.

Moreover, as shown in FIG. 2B, the sloping part 3s of the lower rubber pad 3 is formed to allow a width dimension w of the sloping part 3s to gradually become greater, in planar view (viewed in the axial direction of the suspension spring 2), as it becomes distant from the flat part 3h, namely, conforming with the spirally rising shape of the lower rising part 2t of the suspension spring 2.

For example, when a width dimension of the flat part 3h is defined as w0; a width dimension at a position near the flat part 3h of the sloping part 3s is defined as w1; a width dimension at a position near the center of the sloping part 3s is defined as w2; and a width dimension at a position near the end of the sloping part 3s is defined as w3, the lower rubber pad 3 is formed to have the large/small relation of w0<w1<w2<w3.

From the above, the sloping part 3s which receives the lower rising part 2t of the suspension spring 2 is configured to allow the volume thereof to gradually become larger as the sloping part 3s goes away from the flat part 3h along the shape of the lower rising part 2t.

Herein, when the suspension spring 2 is deformed, the lower rising part 2t allows the amount of deformation thereof to gradually become larger as it goes away from the lower end turn part 2s. Consequently, the sloping part 3s on which the lower rising part 2t of the suspension spring 2 abuts allows the amount of deformation thereof to become larger as it goes away from the flat part 3h.

This allows the sloping part 3s to become larger along the shape of the lower rising part 2t of the suspension spring 2, thereby making it possible to nearly equalize the amount of deformation per unit volume of the sloping part 3s of the lower rubber pad 3 associated with deformation of the suspension spring 2. That is, stress generated in the sloping part 3s of the lower rubber pad 3 can be nearly equalized. Consequently, stress in the lower rubber pad 3 can be equalized and durability of the lower rubber pad 3 can be improved to suppress time degradation thereof. Therefore, life prolongation of the lower rubber pad 3 can be achieved.

<Lip Part L of the Lower Rubber Pad 3>

As shown in FIG. 2A and FIG. 3A, provided at an edge of the sloping part 3s is a lip part L that extends outward from an upper part of the sloping part 3s to be in contact with or abut on the lower rising part 2t of the suspension spring 2.

The lip part L is formed to protrude from an upper part of an edge wall 3s1 of the sloping part 3s in a shape such that a thickness dimension t thereof gradually becomes small (becomes thin) in side view shown in FIG. 3A, to be in contact with or abut on the lower rising part 2t of the suspension spring 2. In other words, the lip part L is formed to allow the thickness dimension t1 to gradually become large (become thick) from a tip L1 to a lip base end part L2. That is, the lip part L is formed to protrude from a lower edge wall 3s0 of the edge wall 3s1 in the winding direction of the suspension spring 2.

The lip part L has a width dimension b which is nearly the same dimension from the lip base end part L2 to the tip L1 when viewed in the axial direction of the suspension spring 2.

As shown in FIG. 3C and FIG. 3D, the lip part L continues to be in contact with or abut on the suspension spring 2, thereby allowing foreign substances j such as grit and gravel to be repelled to the outside to be prevented from entering between the lower rubber pad 3 and the suspension spring 2.

Moreover, as shown in another example of FIG. 2C, a lip part 10L may be formed into a tapering shape such that the width dimension b thereof gradually becomes narrower from the lip base end part L2 to the tip L1 when viewed in the axial direction of the suspension spring 2. In this case, a width dimension bw of the curved surface 3w also gradually becomes narrower from the lip base end part L2 to the tip L1 in the extending direction of the wire of the suspension spring 2 when viewed in the axial direction of the suspension spring 2. Moreover, the lip part 10L is configured to allow a point L0 of the tip L1 thereof to be formed into a chamfered shape (in the form of a curved surface), thereby preventing the edge side of the tip L1 of the lip part 10L from being impaired due to wear, damage or the like.

Alternatively, as shown in still another example of FIG. 2D, the tip L1 of a lip part 20L may be formed into a concave shape when viewed in the axial direction of the suspension spring 2. That is, the point L0 of the lip part 20L may be formed into a concave shape when viewed in the axial direction of the suspension spring 2.

As shown in FIG. 3A, the lip part L formed on the edge wall 3s1 of the sloping part 3s is adapted to elastically deform at all times from the original shape indicated by a two-dot chain line in FIG. 3A to the shape indicated by a solid line in FIG. 3A, to be in contact with the lower rising part 2t of the suspension spring 2. That is, the lip part L formed on the sloping part 3s is configured to be in contact with or abut on the lower rising part 2t of the suspension spring 2 with a continuous elastic force regardless of deformation of the suspension spring 2. Thus, the lip part L keeps the state in which it is in continuous contact with the lower rising part 2t of the suspension spring 2 regardless of deformation of the suspension spring 2, thus allowing the foreign substances j such as grit and gravel to be reliably prevented from entering between the lower rubber pad 3 and the suspension spring 2.

Moreover, as shown in FIG. 3B, the lip part L is formed into a nearly cylindrical shape along a transverse section of a circular shape of the lower rising part 2t of the suspension spring 2. This allows the lip part L of the sloping part 3s of the lower rubber pad 3 to be in contact (close contact) in shape with the lower rising part 2t of the suspension spring 2, thus not forming a gap between the lip part L and the lower rising part 2t. Therefore, the foreign substances j such as grit and gravel are inhibited or prevented from entering between the suspension spring 2 and the lower rubber pad 3.

For example, as shown in FIG. 3C, even when the load on the suspension spring 2 becomes smallest so as to allow the lower rising part 2t of the suspension spring 2 to go away from the lower rubber pad 3, the lip part L of the sloping part 3s continues to be in contact (close contact) with or abut on the lower rising part 2t by the elastic force caused by elastic deformation.

On the other hand, as shown in FIG. 3D, even when the load on the suspension spring 2 becomes largest, the lip part L of the sloping part 3s continues to be in contact (close contact) with or abut on the lower rising part 2t by the elastic force caused by elastic deformation.

This configuration allows the lip part L of the lower rubber pad 3, as shown in FIG. 3B, to continue to be in contact (close contact) with the lower rising part 2t of the suspension spring 2 by the elastic force caused by elastic deformation, regardless of the large and small of the load on the suspension spring 2. Consequently, there is no gap formed between the lower rising part 2t of the suspension spring 2 and the sloping part 3s of the lower rubber pad 3, and thus the foreign substances j such as grit and gravel do not enter between the lower rising part 2t and the sloping part 3s.

The configuration described above produces the following advantageous effects.

1. The lip part L that continues to be in contact with the lower rising part 2t of the suspension spring 2 by the elastic force caused by elastic deformation, regardless of deformation of the suspension spring 2, is formed at the end part of the sloping part 3s of the lower rubber pad 3 that receives the lower end part of the suspension spring 2, thus making it possible to allow the lower rubber pad 3 to follow the deformation of the suspension spring 2.

Consequently, there is no gap formed between the suspension spring 2 and the end part of the sloping part 3s of the lower rubber pad 3.

Therefore, the foreign substances j such as grit and gravel do not enter between the suspension spring 2 and the sloping part 3s of the lower rubber pad 3 (see FIG. 3C and FIG. 3D), thus preventing the suspension spring 2 from being impaired or damaged.

2. Moreover, as shown in another example of FIG. 2C, the lip part 10L of the lower rubber pad 3 may be formed into a tapering shape such that the width dimension b thereof gradually becomes narrower from the lip base end part L2 to the tip L1 when viewed in the axial direction of the suspension spring 2. In this case, the foreign substances j traveling in the winding direction of the suspension spring 2, in which the foreign substances j such as grit and gravel are easiest to enter, are repelled to the outside because of the tapering shape of the tip L1 of the lip part 10L (see an arrow (1 in FIG. 2C). Therefore, the foreign substances j such as grit and gravel are inhibited or prevented from entering between the suspension spring 2 and the lower rubber pad 3.

Note that foreign substances j that are about to enter between the lower rubber pad 3 and the suspension spring 2 in a direction other than the winding direction of the suspension spring 2, impinge or abut on side walls 3i of the lower rubber pad 3, and thus are prevented from entering between the lower rubber pad 3 and the suspension spring 2.

Alternatively, as shown in still another example of FIG. 2D, the point L0 of the lip part 20L is formed into a concave shape to cover the lower rising part 2t of the suspension spring 2 so as to enfold from lateral sides of the lower rising part 2t. Consequently, the foreign substances j such as grit and gravel impinge on side points L01, L02 of the lip part 20L to be repelled and thus can be prevented from entering between the suspension spring 2 and the lower rubber pad 3.

3. Therefore, in friction of the lower rising part 2t and the lower end turn part 2s of the suspension spring 2 with the sloping part 3s of the lower rubber pad 3, a surface coating on the lower rising part 2t and the lower end turn part 2s of the suspension spring 2 is prevented from being worn away or peeled off by the foreign substances j. Consequently, wear, fracture or destruction of the suspension spring 2 can be prevented and thus life prolongation of the suspension spring 2 can be achieved to improve durability and reliability.

4. The thickness of the sloping part 3s of the lower rubber pad 3 is changed to become thicker, conforming with the shape of the lower rising part 2t of the suspension spring 2 which is a compression spring, thus making it possible to improve tracking of the lower rubber pad 3 to the suspension spring 2. This makes it possible to reduce a gap formed between the suspension spring 2 and the lower rubber pad 3. Consequently, the foreign substances j such as grit and gravel can be prevented from entering the gap between the suspension spring 2 and the lower rubber pad 3.

5. The lower rising part 2t of the suspension spring 2 allows the amount of deformation thereof to become larger as it comes near the effective part 2y in the central part, while the sloping part 3s of the lower rubber pad 3 allows the thickness thereof to become increased, conforming with the shape of the lower rising part 2t of the suspension spring 2, thus making it possible to allow the sloping part 3s of the lower rubber pad 3 to deform depending on deformation of the lower rising part 2t. Consequently, excessive stress can be prevented from being generated in the sloping part 3s of the lower rubber pad 3. As a result, durability and life of the lower rubber pad 3 can be improved.

6. As shown in FIG. 2B, the sloping part 3s of the lower rubber pad 3 is formed to allow the width dimension w to become greater as the lower rising part 2t of the suspension spring 2 comes near the effective part 2y. Consequently, the volume of the sloping part 3s becomes larger along the lower rising part 2t of the suspension spring 2.

The lower rising part 2t of the suspension spring 2 allows the amount of deformation thereof to become larger as it comes near the effective part 2y in the central part, and the sloping part 3s of the lower rubber pad 3 allows the amount of deformation thereof to become increased along the lower rising part 2t of the suspension spring 2. However, the sloping part 3s of the lower rubber pad 3 allows the volume thereof to become larger along the lower rising part 2t of the suspension spring 2, thus making it possible to nearly equalize the amount of deformation per unit volume of the lower rubber pad 3.

Consequently, stress generated in per unit volume of the lower rubber pad 3 can be equalized to suppress time degradation of the lower rubber pad 3. Therefore, life prolongation of the lower rubber pad 3 can be achieved. As a result, for a unit composed of the suspension spring 2 and the lower rubber pad 3, durability, reliability and life in the market can be improved.

7. From the above, when the lower rubber pad 3 is used in the suspension spring 2 of the vehicle, an improvement in corrosion durability of the suspension spring 2 can be achieved. Consequently, damage or fracture of the suspension spring 2 can be prevented and thus life prolongation of the suspension spring 2 can be achieved. Also, life prolongation of the lower rubber pad 3 can be achieved. Therefore, a lower-side spring receiving member can be realized which has high reliability and allows maintenance work to be as less as possible.

Second Embodiment

Figure 4A:
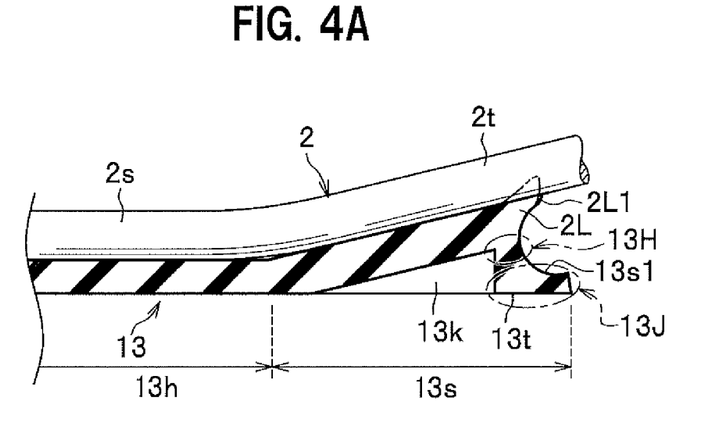
FIG. 4A is a view in a second embodiment, corresponding to the sectional view taken along the line A-A in FIG. 1.
Figure 4B:
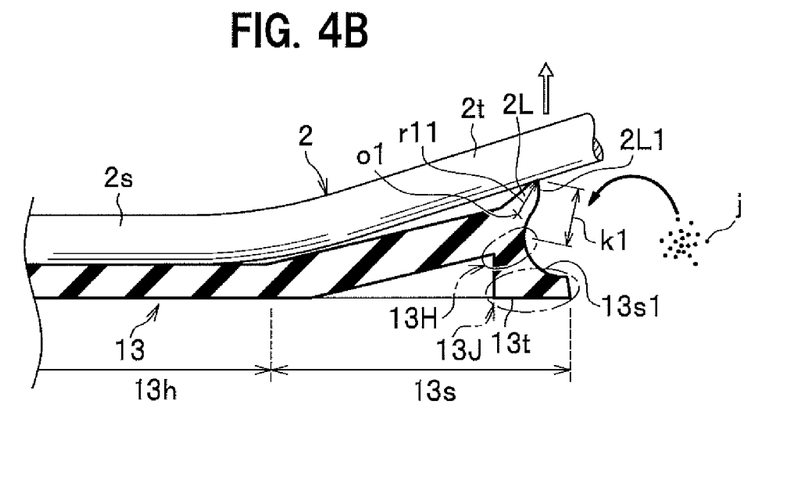
FIG. 4B is a view in the second embodiment, corresponding to the sectional view taken along the line A-A in FIG. 1, showing a case where a load on a suspension spring becomes smallest.

FIG. 4A is a view in a second embodiment, corresponding to the sectional view taken along the line A-A in FIG. 1; FIG. 4B is a view in the second embodiment, corresponding to the sectional view taken along the line A-A in FIG. 1, showing a case where a load on a suspension spring becomes smallest; and FIG. 4C is a view in the second embodiment, corresponding to the sectional view taken along the line A-A in FIG. 1, showing a case where the load on the suspension spring becomes largest.

FIG. 4A shows a state of the suspension spring 2 and a lower rubber pad 13 in the second embodiment, which is observed when the suspension spring 2 reaches full-rebound, i.e., when only the load of the vehicle body is applied to the suspension spring 2.

FIG. 4B shows a state of the suspension spring 2 and the lower rubber pad 13 in the second embodiment, which is observed when the load on the suspension spring 2 becomes smallest.

Figure 4C:
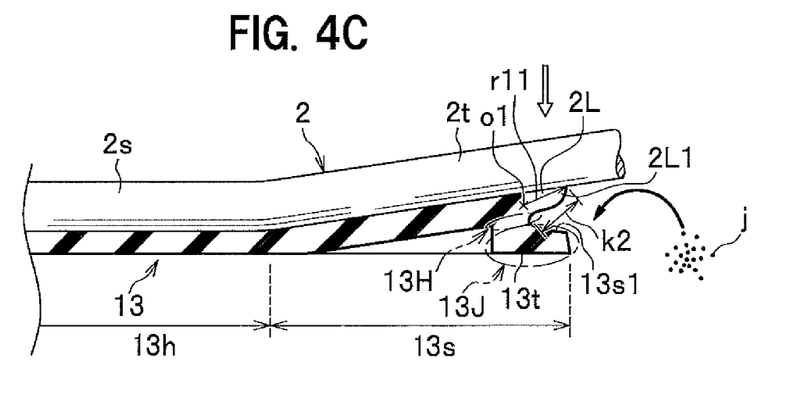
FIG. 4C is a view in the second embodiment, corresponding to the sectional view taken along the line A-A in FIG. 1, showing a case where the load on the suspension spring becomes largest.

FIG. 4C shows a state of the suspension spring 2 and the lower rubber pad 13 in the second embodiment, which is observed when the load on the suspension spring 2 becomes largest.

The lower rubber pad 13 in the second embodiment is formed to shorten a distance by which a lip part 2L formed at an edge of a sloping part 13s slides on the lower rising part 2t of the suspension spring 2.

The other configuration is the same as in the first embodiment, and thus the same component is shown with the same reference sign and detailed description thereof is omitted.

The lip part 2L of the lower rubber pad 13 in the second embodiment is formed to reduce a radius r11 which is a distance from the center o1 of a lip function of the lip part 2L to the tip 2L1 of the lip part 2L, so as to shorten the distance by which the lip part 2L slides on the lower rising part 2t of the suspension spring 2. The lip part 2L continues to be in contact with or abut on the lower rising part 2t of the suspension spring 2 by the elastic force caused by elastic deformation, regardless of the load (spring load) on the suspension spring 2.

The lip function of the lip part 2L means, as shown in FIG. 4B and FIG. 4C, motions such that the lip part 2L revolves or swings so as to follow movement of the lower rising part 2t of the suspension spring 2 to be in contact with or abut on the lower rising part 2t. The center of the lip function means the center of the revolving or swinging motion of the lip part 2L.

The radius r11 is preferably set so as to allow the distance by which the lip part 2L slides on the suspension spring 2, to be nearly minimized.

Alternatively, at least one of the length, width, thickness dimension and shape of the lip part 2L is preferably set so as to allow the distance by which the lip part 2L slides on the suspension spring 2, to be minimized.

Moreover, as shown in side views of FIG. 4A and FIG. 4B, an edge wall 13s1 of the sloping part 13s partially forming the lip part 2L of the sloping part 13s is formed into a nearly C shape.

Forming the edge wall 13s1 into a nearly C shape in side view allows the lip part 2L, an expansible deformation part 13H and a thick support 13J to be formed from the top in the axial direction of the suspension spring 2 (in the up-down direction in FIG. 4A).

The expansible deformation part 13H is thinner and smaller than the thick support 13J. The expansible deformation part 13H has an elastic modulus smaller than the thick support 13J because it is thinner than the thick support 13J. Consequently, the expansible deformation part 13H follows movement (see outlined arrows in FIG. 4B and FIG. 4C) to the axial direction of the lower rising part 2t of the suspension spring 2 to expand and contract so as to allow the lip part 2L to be in contact with or abut on the lower rising part 2t of the suspension spring 2. That is to say, the expansible deformation part 13H assists the lip part 2L in continuing to be in contact with or abut on the suspension spring 2 regardless of the load on the suspension spring 2.

Moreover, the shape of the expansible deformation part 13H is determined based on a balance between the expansible deformation part 13H and a lower space 13k formed on the lower side of the lower rubber pad 13.

On the other hand, the thick support 13J is thicker and greater than the expansible deformation part 13H. That is, the thick support 13J has an elastic modulus greater than the expansible deformation part 13H. Consequently, the thick support 13J mainly performs a function for receiving load applied thereon by the lower rising part 2t of the suspension spring 2. In other words, the thick support 13J serves to receive the load applied thereon by the lower rising part 2t of the suspension spring 2, in a distributed manner, because it is thicker and greater. Consequently, the thick support 13J allows stress generated in per unit volume thereof to be further reduced than before, and thus serves to contribute to an improvement in durability of the lower rubber pad 13.

As indicated by a two-dot chain line in FIG. 4A, the lip part 2L in the second embodiment keeps the state, in the same manner as in the first embodiment, in which the lip part 2L is pressed against the lower rising part 2t of the suspension spring 2 regardless of deformation of the suspension spring 2 and elastically deforms to be in contact with or abut on the lower rising part 2t. In this state, the lower rubber pad 13 is mounted on the suspension spring 2.

Moreover, the lip part 2L of the lower rubber pad 13 is adapted to elastically deform at all times to be in contact with or abut on the lower rising part 2t of the suspension spring 2, by revolving deformation of the lip part 2L and expansible deformation of the expansible deformation part 13H, in each of the state in which the suspension spring 2 is set on the lower rubber pad 13 (see FIG. 4A), the state of FIG. 4B in which the load on the suspension spring 2 suddenly becomes smallest, and the state of FIG. 4C in which the load on the suspension spring 2 becomes largest. This allows no gap to be formed between the sloping part 13s of the lower rubber pad 13 and the lower rising part 2t of the suspension spring 2.

As shown in FIG. 4B, even when the load on the suspension spring 2 becomes smallest, the lip part 2L of the lower rubber pad 13 continues to be in contact with or abut on the lower rising part 2t of the suspension spring 2 by elastic force caused by the revolving deformation of the lip part 2L and the expansible deformation of the expansible deformation part 13H.

Moreover, as shown in FIG. 4C, even when the load on the suspension spring 2 becomes largest, the lip part 2L of the lower rubber pad 13 continues to be in contact with or abut on the lower rising part 2t of the suspension spring 2 by the elastic force caused by elastic deformation.

According to the second embodiment, the lip part 2L of the lower rubber pad 13 continues to be in contact with or abut on the lower rising part 2t of the suspension spring 2 by the revolving deformation of the lip part 2L and the expansible deformation of the expansible deformation part 13H. Consequently, the foreign substances j such as grit and gravel are prevented from entering between the suspension spring 2 and the lower rubber pad 13 (see FIG. 4B and FIG. 4C).

Moreover, the distance by which the lip part 2L slides on the suspension spring 2 is set to be shortened, thus making it possible to prevent coating of the suspension spring 2 from being peeled off or worn away and to keep and maintain the coating of the suspension spring 2 as long as possible. Therefore, life prolongation of the coating of the suspension spring 2 can be achieved.

Further, since wear of the lip part 2L is inhibited, life prolongation of the lip part 2L can be achieved.

Consequently, destruction of the suspension spring 2 and wear of the lower rubber pad 13 can be prevented.

Therefore, maintenance work such as replacing of the suspension spring 2 and the lower rubber pad 13 can be avoided and thus durability and reliability of the suspension spring 2 and the lower rubber pad 13 can be enhanced.

Note that the second embodiment also produces the same operation and effects as in the first embodiment.

Third Embodiment

Figure 5A:
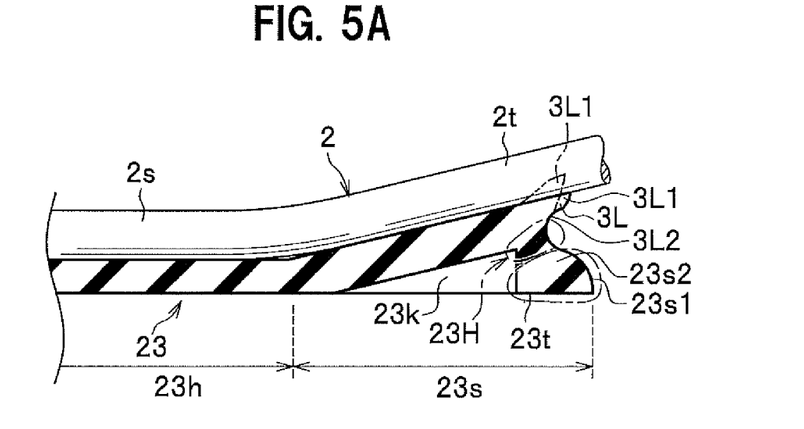
FIG. 5A is a view in a third embodiment, corresponding to the sectional view taken along the line A-A in FIG. 1.
Figure 5B:
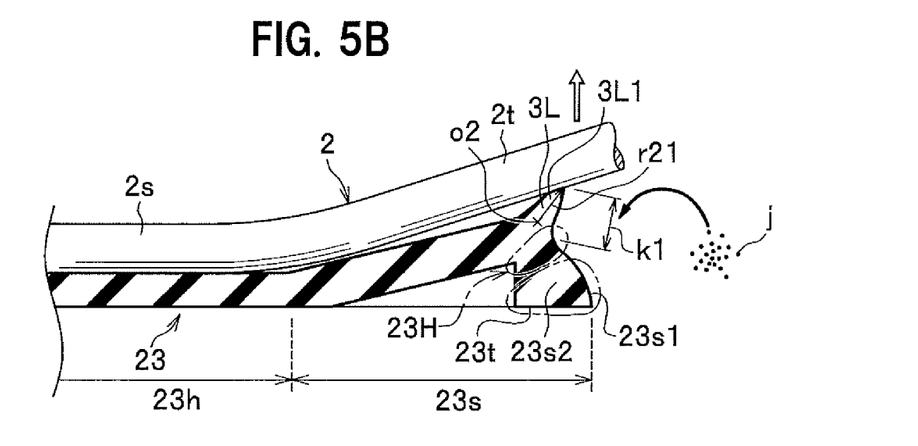
FIG. 5B is a view in the third embodiment, corresponding to the sectional view taken along the line A-A in FIG. 1, showing a case where a load on a suspension spring becomes smallest.
Figure 5C:
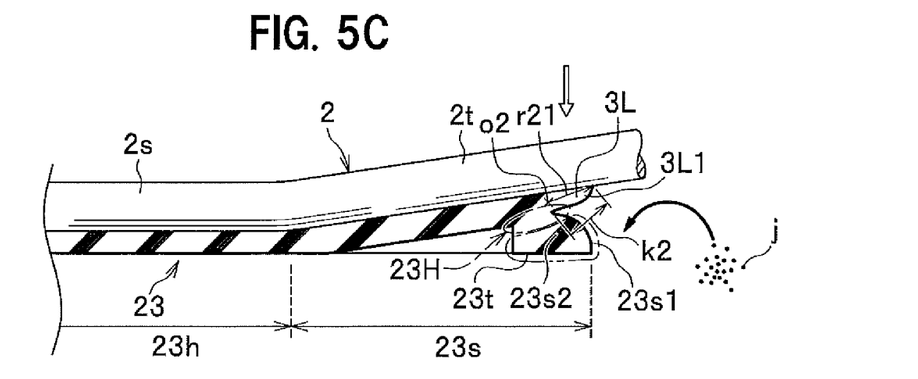
FIG. 5C is a view in the third embodiment, corresponding to the sectional view taken along the line A-A in FIG. 1, showing a case where the load on the suspension spring becomes largest.

FIG. 5A is a view in a third embodiment, corresponding to the sectional view taken along the line A-A in FIG. 1; FIG. 5B is a view in the third embodiment, corresponding to the sectional view taken along the line A-A in FIG. 1, showing a case where a load on a suspension spring becomes smallest; and FIG. 5C is a view in the third embodiment, corresponding to the sectional view taken along the line A-A in FIG. 1, showing a case where the load on the suspension spring becomes largest.

A lower rubber pad 23 in the third embodiment is formed to allow a distance by which a lip part 3L formed at an edge of a sloping part 23s slides on the lower rising part 2t of the suspension spring 2, to be shortened, and formed to have a load receiving part 23s2 that is adapted to receive a load (spring load) on the suspension spring 2.

FIG. 5A shows a state of the suspension spring 2 and the lower rubber pad 23 in the third embodiment, which is observed when the suspension spring 2 reaches full-rebound, i.e., when only the load of the vehicle body is applied to the suspension spring 2.

FIG. 5B shows a state of the suspension spring 2 and the lower rubber pad 23 in the third embodiment, which is observed when the load on the suspension spring 2 becomes smallest.

FIG. 5C shows a state of the suspension spring 2 and the lower rubber pad 23 in the third embodiment, which is observed when the load on the suspension spring 2 becomes largest.

The other configuration is the same as in the first embodiment, and thus the same component is shown with the same reference sign and detailed description thereof is omitted.

The lip part 3L of the lower rubber pad 23 in the third embodiment is formed to reduce a radius r21 which is a distance from the center o2 of a lip function of the lip part 3L to the tip 3L1 of the lip part 3L, so as to shorten the distance by which the lip part 3L slides on the lower rising part 2t of the suspension spring 2. The lip part 3L continues to be in contact with or abut on the lower rising part 2t of the suspension spring 2 by the elastic force caused by elastic deformation, regardless of the load (spring load) on the suspension spring 2.

The lip function of the lip part 3L means, as shown in FIG. 5B and FIG. 5C, motions such that the lip part 3L revolves or swings so as to follow movement of the lower rising part 2t of the suspension spring 2 to be in contact with or abut on the lower rising part 2t. The center of the lip function means the center of the revolving or swinging motion of the lip part 3L.

Moreover, the load receiving part 23s2 formed into a shape such that an edge wall 23s1 of the sloping part 23s swells outward conforming with the shape of the lower rising part 2t of the suspension spring 2 is formed below the lip part 3L of the lower rubber pad 23.

This allows the lip part 3L of the sloping part 23s, and the edge wall 23s1 that is formed conforming with the shape of the lower rising part 2t, to be formed into a nearly S shape as shown in side views of FIG. 5A and FIG. 5B.

Herein, the radius r21 which is a distance from the center o2 of the lip function of the lip part 3L to the tip 3L1 of the lip part 3L is preferably set so as to allow the distance by which the lip part 3L slides on the suspension spring 2, to become smaller.

Alternatively, at least one of the length, width and thickness dimension of the lip part 2L is preferably set so as to allow the distance by which the lip part 3L slides on the suspension spring 2, to be minimized.

As indicated by a two-dot chain line in FIG. 5A, the lip part 3L of the lower rubber pad 23 keeps the state, in the same manner as in the first embodiment, in which the lip part 3L is pressed with an elastically deformed state against the lower rising part 2t of the suspension spring 2 regardless of the load (spring load) on the suspension spring 2, to be in contact with or abut on the lower rising part 2t with the elastically deformed state. In this state, the lower rubber pad 23 is mounted on the suspension spring 2.

The lip part 3L of the lower rubber pad 23 is configured to elastically deform to be in contact with or abut on the lower rising part 2t of the suspension spring 2, thereby allowing no gap to be formed between the sloping part 23s of the lower rubber pad 23 and the lower rising part 2t of the suspension spring 2.

As shown in FIG. 5B and FIG. 3B, when the load on the suspension spring 2 becomes smallest, the lip part 3L of the lower rubber pad 23 continues to be in contact with or abut on the lower rising part 2t of the suspension spring 2 by the elastic force caused by elastic deformation thereof.

Moreover, as shown in FIG. 5C and FIG. 3B, even when the load on the suspension spring 2 becomes largest, the lip part 3L of the lower rubber pad 23 continues to be in contact with or abut on the lower rising part 2t of the suspension spring 2 by the elastic force caused by elastic deformation thereof.

On the other hand, formed below the lip part 3L are an expansible deformation part 23H and the load receiving part 23s2.

The expansible deformation part 23H has an elastic modulus smaller than the load receiving part 23s2 because it is thinner than the load receiving part 23s2, and thus performs a function of expanding and contracting depending on the load on the suspension spring 2. This assists the lip part 3L in continuing to be in contact with or abut on the suspension spring 2 regardless of the load on the suspension spring 2.

Moreover, the shape of the expansible deformation part 23H is determined based on a balance between the expansible deformation part 23H and a lower space 23k formed on the lower side of the lower rubber pad 23.

As shown in FIG. 5A to FIG. 5C, the load receiving part 23s2 is formed into a shape such that the edge wall 23s1 of the sloping part 23s swells outward (in the winding direction of the suspension spring 2).

Consequently, as shown in FIG. 5C, when a load (spring load) on the suspension spring 2 is applied to the lower rubber pad 23, the load is received at the load receiving part 23s2 formed at the end part of the sloping part 23s, and distributed on the load receiving part 23s2. Therefore, stress generated in the lower rubber pad 23 can be reduced to contribute to an improvement in durability of the lower rubber pad 23.

Note that, as long as the load receiving part 23s2 has a shape capable of receiving the load (spring load) on the suspension spring 2, it may be formed into the shape of a cylinder having an axis in the axial direction of the suspension spring 2 or in a direction perpendicular to the axial direction, or may be formed into a spherical shape. Alternatively, the load receiving part 23s2 may be formed into the shape of a rectangular column, and the form thereof is not limited to these examples, but can be arbitrarily selected.

According to the third embodiment, since the distance by which the lip part 3L slides on the suspension spring 2 is set to be shortened, the coating of the suspension spring 2 can be inhibited or prevented from being peeled off or worn away. Consequently, the suspension spring 2 can be avoided from being rusted and/or fractured and thus life prolongation of the suspension spring 2 can be achieved.

Moreover, since wear of the lip part 3L is inhibited, life prolongation of the lip part 3L can be achieved. Consequently, maintenance work such as replacing of the lower rubber pad 23 can be avoided.

Moreover, the expansible deformation part 23H is formed below the lip part 3L and adapted to expand and contract depending on the load on the suspension spring 2. This makes it possible to allow the expansible deformation part 23H to assist the motion in which the lip part 3L continues to be in contact with or abut on the suspension spring 2 regardless of the load on the suspension spring 2, and to make the motion more reliable.

Consequently, as shown in FIG. 5B and FIG. 5C, the lip part 3L can more reliably continue to be in contact with or abut on the suspension spring 2 regardless of the load on the suspension spring 2.

In addition, when the load (spring load) on the suspension spring 2 is applied to the lower rubber pad 23, the load is reliably received at the load receiving part 23s2 formed on the sloping part 23s and having a relatively large volume. Consequently, the load applied to the lower rubber pad 23 is distributed on the load receiving part 23s2 having the relatively large volume. Therefore, stress generated in the lower rubber pad 23 can be reduced through distribution of the load, and durability of the lower rubber pad 23 can be improved and thus life prolongation of the lower rubber pad 23 can be achieved.

As a result, durability and reliability of the lower rubber pad 23 as a unit in the market can be improved.

Moreover, the load receiving part 23s2 is formed into a shape such that the edge wall 23s1 of the sloping part 23s swells outward with a curvature, thus making it possible to allow the load receiving part 23s2 to normally receive the load on the suspension spring 2 without being crushed.

Furthermore, the load receiving part 23s2 is formed to protrude more than the lip part 3L in the winding direction of the suspension spring 2. Consequently, even when the lip part 3L is pressed downward by the suspension spring 2, the lip part 3L abuts on the load receiving part 23s2 to be received with elasticity, thereby preventing the lip part 3L from being damaged. As a result, reduction in the man-hours of work such as replacing and maintenance carried out by a serviceman in the market can be achieved.

Unlike the third embodiment, for example, where the load receiving part 23s2 is not provided, there is a risk that one end part of the lower rubber pad 23 at which the lip part 3L is located is crushed when the lip part 3L is pressed downward by the suspension spring 2.

Moreover, unlike the third embodiment, where a base end part 3L2 of the lip part 3L is formed of a corner part that has a right angle shape or a concave acute angle shape in side view, there is a risk of wear or fracture of the corner part due to stress concentration.

The third embodiment makes it possible to achieve improvement in durability of the suspension spring 2 and to enhance reliability of the suspension spring 2. Moreover, improvement in durability of the lower rubber pad 23 can be achieved and reliability of the lower rubber pad 23 can be enhanced.

Note that the third embodiment also produces the same operation and effects as in the first embodiment.

OTHER EMBODIMENTS

1. The lip part L, 2L, 3L explained in the above first to third embodiments is preferably configured, in terms of suppression of wear caused by the sliding motion thereof, so as to adjust the shape of the lip part L, 2L, 3L extending from the sloping part 3s to allow the sliding distance thereof to be made as short as possible while allowing the lip part L, 2L, 3L to be in contact with or abut on the lower rising part 2t of the suspension spring 2 at all times.

For example, the lip part L, 2L, 3L, 10L, 20L may be formed to extend in the extending direction of the lower rising part 2t of the suspension spring 2 and to be in contact with or abut on the lower rising part 2t while vertically deforming (vertically moving) relative to the lower rising part 2t, thereby shortening the sliding distance thereof.

Alternatively, the lip part L, 2L, 3L, 10L, 20L may be formed to be in contact with or abut on nearly the same location on the lower rising part 2t in deformation of the lower rising part 2t of the suspension spring 2, thereby shortening the sliding distance thereof relative to the lower rising part 2t.

2. The load receiving part 23s2 explained in the third embodiment may be applied in the configurations of the first and second embodiments. Also, the load receiving part 23s2 may be configured separately from and independently of the lip part L, 2L, 3L, 10L, 20L in the first, second and third embodiments.
3. The lip part L, 2L, 3L, 10L, 20L explained in the above first to third embodiments may be configured to be applied to the lower rubber pad 3, 13, 23 not having the sloping part 3s, 13s, 23s.
4. The lower rubber pad 3, 13, 23 explained in the above first to third embodiments may be applied to a spring receiving member of a compression spring not accompanied with a suspension device.
5. Although in the above first to third embodiments, description is given of the case where the present invention is applied to the lower rubber pad 3, 13, 23 located on one side, the present invention may be applied to the lower rubber pad 4 located on the other side.
6. Although in the above first to third embodiments, description is given of the case where the width dimension of the lower rubber pad 3 has the large/small relation of w0<w1<w2<w3, the width dimension of the lower rubber pad 3 may be set to be nearly the same, such as w0≅w1≅w2≅w3.
7. Note that, although in the above first to third embodiments, description is given of, by way of example, the case where the present invention is applied to the suspension device S of the automobile, this merely shows one example of the present invention. That is, the present invention can be widely applied to, without being limited to, all that are provided with a suspension device, e.g., vehicles such as a two-wheeled vehicle, a mountain bike (MTB), a three-wheeled vehicle (automatic), a four-wheeled vehicle and a railway vehicle, industrial machinery such as an aircraft and a snow compaction vehicle, or agricultural machinery. Alternatively, the present invention may be applied to a compression coil spring not having a suspension device.
8. Although in the above first to third embodiments, description is given of various configurations, a configuration obtained by suitably selecting each configuration to combine together may be adopted, or the configurations may be used independently of each other.
9. The above first to third embodiments show one example of the present invention, and a variety of concrete embodiments are possible within the scope of the construction described in the claims.

REFERENCE SIGNS LIST

2 Suspension spring (Compression spring)
13J Thick support (Load receiving part)
2s Lower end turn part (End turn part)
2t Rising part (Lower rising part)
2u Upper end turn part
2v Upper rising part
2y Effective part
3 Lower rubber pad (Lower-side spring receiving member)
3h, 13h, 23h Flat part
3s, 13s, 23s Sloping part
4 Upper rubber pad (Upper-side spring receiving member)
23s2 Load receiving part
h2 Thickness
L, 2L, 3L, 10L, 20L Lip part (Contact part)
r11 Radius (Radius of curvature)
r21 Sliding radius (Radius in sliding motion)
w1, w2, w3 Width dimension (Width)
13H, 23H Expansible deformation part

The invention claimed is:
1. A lower-side spring receiving member adapted to receive a compression spring at a lower side of the compression spring, the compression spring having an effective part, first and second end turn parts which do not elastically deform, and first and second rising parts located between the effective part and the first and second end turn parts, respectively, the lower-side spring receiving member comprising:
a contact part that is formed to protrude outward from one end in an extending direction of the lower-side spring receiving member, and adapted to be in contact with the first rising part so as not to form a gap between the contact part and the first rising part, and the contact part is in contact with the first rising part by elastic force caused by elastic deformation of the compression spring, regardless of a load on the compression spring;

a load receiving part adapted to receive a spring load of the compression spring, the load receiving part being formed on an opposite side of the contact part at the one end in the extending direction of the lower-side spring receiving member, and formed to protrude outward farther in a winding direction of the compression spring than a tip of the contact part when viewed in an axial direction of the compression spring, and to swell outward with a convex curvature; and a sloping part adapted to receive the first rising part, a width of the sloping part viewed in the winding direction of the compression spring gradually becoming greater as the sloping part becomes distant from the first end turn part connected to the first rising part.

2. The lower-side spring receiving member according to claim 1, further comprising an expansible deformation part that is provided between the contact part at the one end and the load receiving part, and adapted to elastically deform depending on a load on the compression spring, wherein the expansible deformation part has a thinner shape than the load receiving part.

3. The lower-side spring receiving member according to claim 1, wherein the sloping part is formed to extend from a flat part and has a thickness gradually increasing along the first rising part.

4. The lower-side spring receiving member according to claim 1, wherein the contact part is adapted to be in contact with or abut on nearly the same location on the first rising part in deformation of the first rising part.

5. The lower-side spring receiving member according to claim 1, wherein an upper-side spring receiving member located on the other side of the compression spring, which is adapted to receive the compression spring together with the lower-side spring receiving member located on one side of the compression spring, and the lower-side spring receiving member are configured similarly and symmetrically.

* * * * *